(12) United States Patent
Strohm et al.

(10) Patent No.: US 11,330,823 B2
(45) Date of Patent: May 17, 2022

(54) CLOSURE MODULE AND METHOD FOR CLOSING AND/OR SEPARATING FILLED SAUSAGE CASINGS CONNECTED VIA A SAUSAGE NECK

(71) Applicant: Albert Handtmann Maschinenfabrik GmbH & Co. KG, Biberach (DE)

(72) Inventors: Kurt Strohm, Attenweiler (DE); Gerhard Schliesser, Wain (DE); Manfred Baechtle, Schemmerhofen (DE); Robert Winghart, Oberstadion (DE); Florian Osswald, Ulm (DE); Jochen Merk, Ochsenhausen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 390 days.

(21) Appl. No.: 16/460,644

(22) Filed: Jul. 2, 2019

(65) Prior Publication Data
US 2020/0000107 A1    Jan. 2, 2020

(30) Foreign Application Priority Data

Jul. 2, 2018    (EP) .................................. 18 181 157

(51) Int. Cl.
*A22C 11/00*    (2006.01)
*A22C 11/10*    (2006.01)
*A22C 13/00*    (2006.01)

(52) U.S. Cl.
CPC .......... *A22C 11/10* (2013.01); *A22C 13/0009* (2013.01)

(58) Field of Classification Search
USPC ....................................................... 452/46
See application file for complete search history.

(56) References Cited

U.S. PATENT DOCUMENTS 3,382,641 A * 5/1968 Jensen ............... A22C 13/0003
                                                            53/138.4
3,992,606 A    11/1976 Arutt et al.
5,073,141 A * 12/1991 Lemmer .............. A22C 11/001
                                                              99/441

FOREIGN PATENT DOCUMENTS

| AT | 178854 B | 6/1954 |
| DE | 1080011 B | 4/1960 |
| EP | 1258198 A1 | 11/2002 |
| EP | 1471003 A2 | 10/2004 |
| EP | 1609366 A1 | 12/2005 |

(Continued)

OTHER PUBLICATIONS

China National Intellectual Property Administration, Office Action and Search Report Issued in Application No. 201910585784.1, dated Jan. 19, 2021, 20 pages. (Submitted with Partial Translation).

(Continued)

*Primary Examiner* — Richard T Price, Jr.
(74) *Attorney, Agent, or Firm* — McCoy Russell LLP (57) ABSTRACT

A closure module and a method for closing and/or separating filled sausage casings connected via a sausage neck, comprising, in at least one example, a first electrode and a second electrode located opposite the first one, the electrodes being arranged such that a sausage neck can be placed therebetween and being adapted to be moved relative to each other and towards the sausage neck to such an extent that a current can flow from the first electrode into the sausage neck and via the sausage neck into the second electrode.

20 Claims, 8 Drawing Sheets

(56) References Cited

FOREIGN PATENT DOCUMENTS

| | | | |
|---|---|---|---|
| GB | 716783 | A | 10/1954 |
| KR | 20040017104 | A | 2/2004 |
| WO | 9407371 | A1 | 4/1994 |

OTHER PUBLICATIONS

China National Intellectual Property Administration, Office Action and Search Report Issued in Application No. 201910585442.X, dated Jan. 28, 2021, 20 pages.

* cited by examiner

CLOSURE MODULE AND METHOD FOR CLOSING AND/OR SEPARATING FILLED SAUSAGE CASINGS CONNECTED VIA A SAUSAGE NECK

TECHNICAL FIELD

The present disclosure relates to a closure module and a method for closing and/or separating filled sausage casings connected via a sausage neck and also for closing and/or separating sausage casing ends.

BACKGROUND AND SUMMARY

In the production of sausage products by means of filling and portioning systems, mainly natural, artificial and collagen casings are used as sausage casings and are filled with sausage meat by means of a vacuum filler. Through constricting and dividing (e.g. twisting off) the filled sausage casings within the twist-off line, a sausage chain consisting of a plurality of connected, filled sausage casings, i.e. portions, is obtained. The connected portions are closed at defined division points such that the division point cannot open again during the separation process executed e.g. with the aid of a knife. Likewise, open sausage ends must be closed, if sausage casings tear, and the end of the sausage chain must be closed as well.

For closing sausage portions, e.g. clippers used for applying metal clips are known. EP 1609366 already describes that two neighboring sausage portions have applied thereto an electric current, which will then flow from one sausage portion to the neighboring sausage portion, whereby the intermediate sausage neck can be cut. In this arrangement, the electrodes are arranged at a prescribed fixed distance from one another. Due to the fact that the current is coupled into the sausages, comparatively high currents are necessary. Therefore, it cannot be excluded that reactions may take place in the filling material and that the delicate sausage casings may get damaged. Moreover, there will also be a direct contact between the electrodes and the rounded sausage ends of the sausage portions. At the rounded sausage ends mechanical stress is, however, caused at the sausage casing by the e.g. twisted-off division point and the displacement of the sausage meat. If a current is now introduced at the rounded sausage end, the sausage casing, which is under mechanical stress, may tear when heated. This may happen especially in the case of delicate natural casings. Another drawback of the known device is to be seen in that the end of a sausage chain cannot be closed, since, for applying the voltage, two sausages will always be necessary. Also a changeover for different calibers is laborious.

Taking this as a basis, it is the object of the present disclosure to provide an improved closure module and an improved method for closing and/or separating filled sausage casings connected via a sausage neck, which allow the filled sausage casings to be closed, even at the end of the sausage chain, more carefully, easily and reliably.

A closure module for closing and/or separating filled sausage casings connected via a sausage neck, comprises a first electrode and a second electrode located opposite the first one. The electrodes are arranged such that a sausage neck can be placed therebetween. This means that the electrodes are arranged on opposed sides of the sausage neck. The electrodes are adapted to be moved relative to and towards each other. This means that at least one electrode can be moved towards the other, so that the distance between the electrodes can be reduced—when seen in the direction of movement of the electrodes. The electrodes are adapted to be moved relative to and towards each other and onto the sausage neck to such an extent that a current can flow from the first electrode into the sausage neck and via the sausage neck into the second electrode. It follows that the current for closing and/or separating flows only through the sausage neck but not through the portion, i.e. the filled sausage casing. This has the advantage that the electrodes will not contact the filled sausage casing, but only the sausage neck. The sausage neck, i.e. for example the twisted-off sausage casing located between the stuffed sausage portions, serves as an electrolyte between the pair of electrodes. Hence, the current can flow from one electrode through the sausage neck to the other electrode. The electric energy is converted into thermal energy when passing through the sausage neck (resistance) and heats the latter. In natural casings, for example, the thermal denaturation of collagen (coagulation of protein) will then begin. In addition, from approx. 100° onwards, water evaporates, so that the natural casing of the sausage neck coagulates and will thus be closed. This means that the successive filled sausage casings are closed via the sausage neck, but are still connected to one another. A further supply of energy leads to a rise in temperature and to a decomposition and cutting off of the casing. In principle, it is possible to heat the sausage neck only to such an extent that it coagulates and that the filled sausage casings will be closed.

The present disclosure is also advantageous insofar as, due to the fact that the sausage neck is closed, or closed and separated via the electrodes which are adapted to be moved towards one another, even the last sausage on the end of a sausage chain can be closed. It follows that, in comparison with the prior art, an additional portion with or without sausage meat is no longer required for closing a sausage portion at the end of a sausage group. In the prior art, an additional empty casing has often been produced, so that e.g. a knot could be made at the end of a sausage group. Furthermore, when an additional empty portion was produced in the prior art, it was necessary that, prior to closing, the operator pushed back the sausage mass into the sausage portion to be closed and paid attention to the length of the portion and its degree of stuffing. The present disclosure therefore allows a reduction of the costs for casings and/or sausage meat.

Moreover, product optimization is accomplished with respect to weight, length, visual appearance and stuffing degree of the portions to be closed. All in all, reliably closed sausage ends will also lead to hygienic improvements.

Since the electrodes are moved onto the sausage neck, the closure module can be used for different calibers in an arbitrary manner, without any mechanical changeover being necessary.

According to at least one embodiment of the present disclosure, the closure module further comprises a first stamp element as well as an oppositely disposed second stamp element, which are adapted to be moved relative to and towards one another such that the sausage neck will be clamped between the opposed stamp elements. This means that the opposed end faces of the stamp elements can be moved into contact with one another. The stamp element serves to clamp the sausage neck and is used as a spacer and insulator to the rounded sausage end.

It will be particularly advantageous, when the closure module comprises a first stamp pair with two juxtaposed (when seen in the longitudinal direction of the closure module and of the stretched sausage neck, i.e. transversely to the direction of movement of the electrodes), spaced-apart stamp elements as well as an oppositely disposed second stamp pair with two juxtaposed, spaced-apart (when see in the longitudinal direction) stamp elements, which are adapted to be moved relative to and towards one another such that the sausage neck will be clamped between the opposed stamp elements, the respective electrodes being arranged between the stamp elements of a stamp pair. The stamp pair may also be configured as an integral component, e.g. as a closure unit. The stamp element pair provides an improved stability. In addition, the stamp elements allow a safe spacing to the rounded sausage ends of the filled sausage casings. Through the electrode pair, the current is introduced between the clamped points within the sausage neck or the open sausage end and will thus not flow across the sausage casing of the rounded sausage ends, which is under mechanical stress. Due to the fact that the sausage neck is clamped before the transition to the rounded sausage end, the mechanical stresses are so to speak "held back". The clamping of the division point must not be eliminated until the flow of current has ceased to exist, e.g. after closing and/or cutting off, so that reliable closing will be possible. The stamp elements are made of a non-conductive material such that no current will flow from the electrodes to the stamp elements.

According to an advantageous embodiment, the electrodes are movable relative to and towards one another only up to a minimum distance $a_M$. Short circuits within the electrode pair can be prevented in this way.

According to one or more embodiments, the juxtaposed stamp elements of a stamp element pair are configured as spreading elements such that they are laterally movable apart and away from the electrodes. In at least one example, the stamp elements can move apart before they clamp the sausage neck, the closure module being provided with a guide unit in at least one example, which is configured such that, when the opposed stamp elements are moved relative to and towards one another, they move, at least sectionwise, simultaneously laterally away from one another towards the respective sausage ends.

Hence, the closure module can be applied within a narrower division point. Shortly before the stamp elements clamp the sausage neck, they rotate, e.g. via a curved path, outwards in the direction of the rounded sausage ends, enlarge the division point, i.e. the sausage neck, and clamp the sausage neck at the transition to the rounded sausage end. Without this spreading function, i.e. when the stamp elements are already above the rounded sausage ends at a spread-apart position upon engaging the sausage neck, there is the risk that, during closing, the stamp elements will apply pressure to the rounded sausage ends, which are under mechanical stress, and will then cause damage to them. Only the sausage neck is to be clamped, while the rounded sausage ends should remain unaffected.

According to at least one embodiment, the stamp elements of at least one stamp element pair are supported such that they are rotatable, in particular freely rotatable, about an axis extending substantially along the longitudinal direction and transversely to the direction of movement of the electrodes. It is also possible that the stamp elements of at least one stamp element pair are, additionally or alternatively, rotatably supported about an axis extending substantially transversely to the longitudinal direction of the closure module and transversely to the direction of movement of the electrodes.

In this way, it can be ensured that the end faces of the stamp elements will always be oriented parallel to each other and that tolerances can be compensated. It is also possible that e.g. one stamp element is rotatably supported about an axis extending in the longitudinal direction and the opposite stamp element is rotatably supported about an axis perpendicular thereto.

The elements are, in an advantageous manner, supported such that they are freely rotatable, so that tolerances can be compensated for automatically. According to a further embodiment, at least one stamp pair may also comprise a spring-loaded linear guide as a tolerance compensation unit.

According to one or more embodiments, the closure module comprises two closure units, which are movable relative to and towards each other. This means that either the first and/or the second closure unit can be moved towards the respective other closure unit, the first closure unit comprising the first electrode and a first stamp element pair and the second closure unit comprising the second electrode and the second stamp element pair. For the purpose of tolerance compensation, at least one of the closure units can be supported such that it is rotatable, in particular freely rotatable, about an axis in the longitudinal direction and/or an axis transversely to the longitudinal direction. It is also possible to support one closure unit such that it is rotatable, in particular freely rotatable, about an axis in the longitudinal direction and the other closure unit such that it is rotatable, in particular freely rotatable, about an axis transversely to the longitudinal direction.

The electrodes and the stamp elements, respectively, or the closure units may be movable towards one another manually or by means of a positioning drive, in particular a pneumatic or an electric positioning drive.

According to an advantageous embodiment, the closure module is configured as a hand-held device and is provided with a handle area that comprises two spaced-apart, opposed handle elements which are movable towards each other and which are each coupled with the respective opposed electrodes or electrodes and stamp elements such that, when the handle elements are moved towards each other, also the respective electrodes and stamp elements will move towards one another. A hand-held device of the type in question is particularly easy to handle and can easily be used by the operator in the form of hand pliers.

The method according to the present disclosure comprises the following steps:

placing a sausage neck between a first electrode and a second electrode located opposite the first electrode, the electrodes being, when seen in the longitudinal direction, spaced-apart from the rounded sausage ends of the filled sausage casings such that the electrodes will not contact the filled sausage casings, moving the electrodes relative to each other and onto the sausage neck such that a current will flow from the first electrode into the sausage neck and via the sausage neck into the second electrode, whereby the filled sausage casings will be closed, and, in some examples, separated from one another.

It follows that, according to the present disclosure, the current can flow perpendicular to the sausage neck.

During closing of the sausage neck by at least two opposed stamp elements, such as by opposed stamp element pairs, having a respective electrode arranged therebetween, the sausage neck is clamped by the stamp element pairs, which are moved into contact with one another. The electrodes, however, are only moved relative to and towards one another up to a minimum distance $a_M$, so that a short circuit will be prevented.

During a first time interval, the electrodes supply an amount of energy per unit time, such that the sausage neck is heated so strongly that e.g. the protein in the sausage neck will coagulate. Coagulation occurs e.g. at a temperature in the range of 65° C. to 100° C. The filled sausage casings can thus be closed. If it is now also intended to additionally separate the filled sausage casings from one another, the amount of energy per unit time can be increased, in particular in a peaklike manner, during a second time interval, such that the sausage neck will decompose and will be cut off.

Advantageously, the stamp elements will not be moved apart until the supply of current has been interrupted.

The closure module is particularly suitable for use with electrically conductive sausage casings, such as sheep-intestine casings, pig-intestine casings, bovine-intestine casings and collagen casings.

High-frequency currents, in particular in a frequency range of 300 kHz to 500 kHz, and in a voltage range of 50 to 500 V, in particular in a voltage range of 80 to 430 V, proved to be advantageous for the method according to the present disclosure.

In the following, the present disclosure will be explained in more detail making reference to the figures following hereinafter.

DETAILED DESCRIPTION

FIGS. 1-16 show the relative positioning of various components of a closure module. If shown directly contacting each other, or directly coupled, then such components may be referred to as directly contacting or directly coupled, respectively, at least in one example. Similarly, components shown contiguous or adjacent to one another may be contiguous or adjacent to each other, respectively, at least in one example. As an example, components lying in face-sharing contact with each other may be referred to as in face-sharing contact or physically contacting one another. As another example, elements positioned apart from each other with only a space therebetween and no other components may be referred to as such, in at least one example.

As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. In at least one example FIGS. 1-16 may be drawn to scale, although other relative dimensions may be used.

Figure 1:
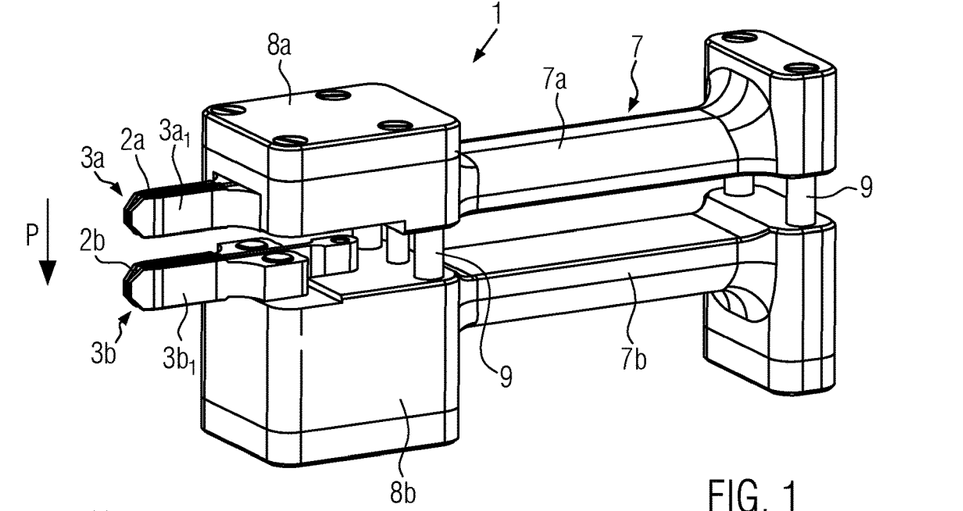
FIG. 1 shows a perspective view of a closure module according to a first embodiment of the present disclosure.
Figure 4:
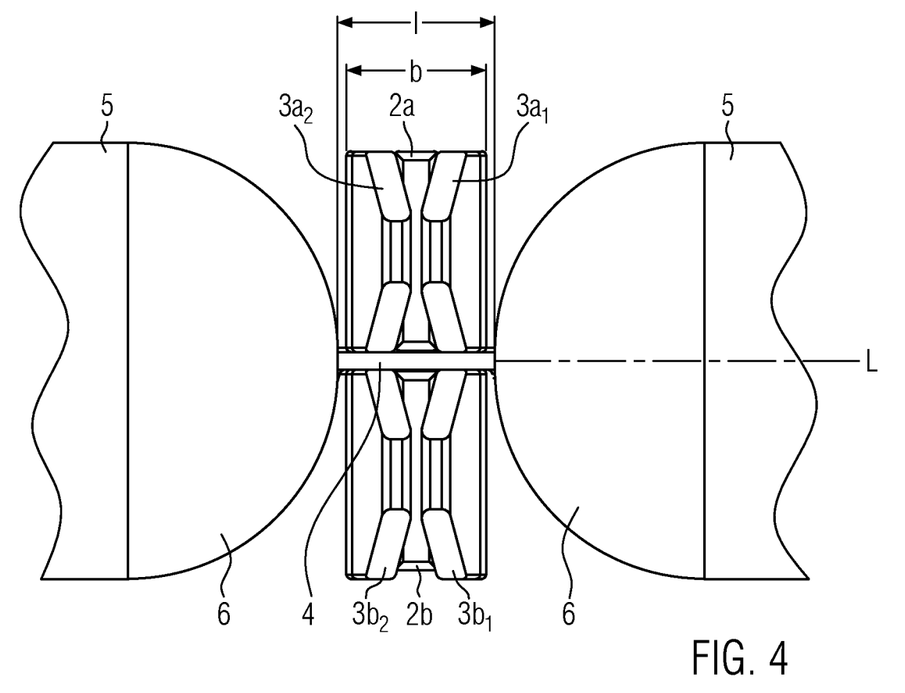
FIG. 4 shows a front view of the embodiment shown in FIGS. 1 to 3, in a slightly open position.

FIG. 1 shows in a perspective view a first embodiment of a closure module 1 according to the present disclosure. The closure module 1 serves to close, or to close and separate filled sausage casings 5 connected via a sausage neck 4. Such electrically conductive sausage casings may e.g. be a natural casing kept in salt water or an artificial or collagen casing. The sausage casing is filled in advance e.g. by means of a filling machine, a vacuum filler, by way of example, with a pasty mass, e.g. sausage meat. By constricting or dividing the filled sausage casings within a twist-off line, a sausage chain of a plurality of interconnected, filled sausage casings 5, i.e. portions, is obtained, the filled sausage casings 5 being connected to one another via a twisted sausage neck 4. FIG. 4 shows, by way of example, two filled sausage casings 5 whose rounded ends 6 are interconnected via the sausage neck 4. The interconnected sausage chains consisting of a plurality of interconnected portions are then closed by the closure module 1, e.g. such that the filled sausage casings cannot open again, e.g. during a separation process with the aid of a knife. However, as will be described in more detail hereinafter, it is also possible to close, with the aid of the closure module 1, the individual filled sausage casings 5 by the closure module 1 and to cut through the sausage neck.

Figure 2:
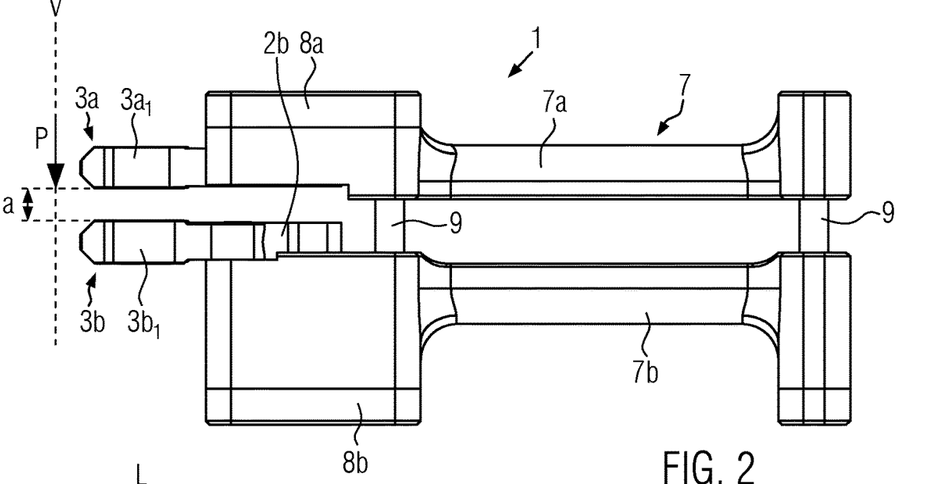
FIG. 2 shows a side view of the embodiment shown in FIG. 1.

As can be seen from FIG. 1, the closure module 1 according to the present disclosure comprises two opposed electrodes 2a, 2b, which are movable relative to one another, as shown by the arrow P. FIGS. 1 and 2 show the closure module at an open position. As can be seen from FIG. 2, the electrodes 2a, 2b are spaced apart at a distance a. In this embodiment, stamp elements $3a_1$, $3a_2$ as well as $3b_1$, $3b_2$ are arranged in the longitudinal direction L (which corresponds to the longitudinal direction L of the filled sausage casings and of the stretched sausage neck and to the longitudinal direction L of the closure module—cf. also FIGS. 3 and 4).

The upper stamp elements $3a_1$, $3a_2$ define a first stamp element pair $3a$ and the lower stamp elements $3b_1$, $3b_2$ define a second stamp element pair $3b$. Also the stamp element pairs $3a$, $3b$ are movable relative to and towards one another along a direction of movement V, the direction vector V being here directed perpendicular to the direction vector L. The stamp elements are made of a non-conductive material and protrude in a forward direction beyond the electrodes $2a$, $2b$, as can be seen in particular from FIG. 3.

The stamp elements may, however, also be configured such that they are made of a conductive material or a non-conductive material and provided with an insulating coating.

However, also the electrodes may have an insulating coating and may be exposed only at the places across which current is intended to flow to other electrodes; this means that e.g. the respective lower and/or upper end face of the opposed electrodes is exposed at least partially.

While the stamp elements extend substantially parallel to one another in the area of the electrode, the distance between the stamp elements $3a_1$, $3a_2$ and $3b_1$, $3b_2$ decreases in a forward direction, so that the respective electrode is located at a protected position. The stamp elements are also intended to center the gap between the sausage portions in this way.

Figure 3:
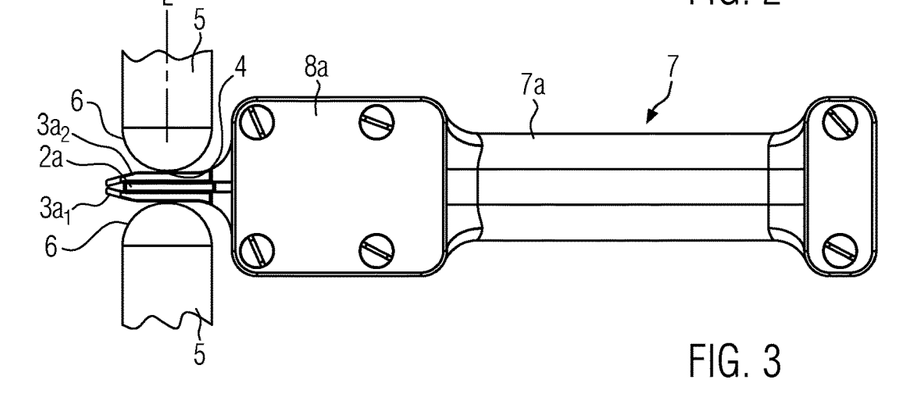
FIG. 3 shows a top view of the embodiment shown in FIGS. 1 and 2.
Figure 5:
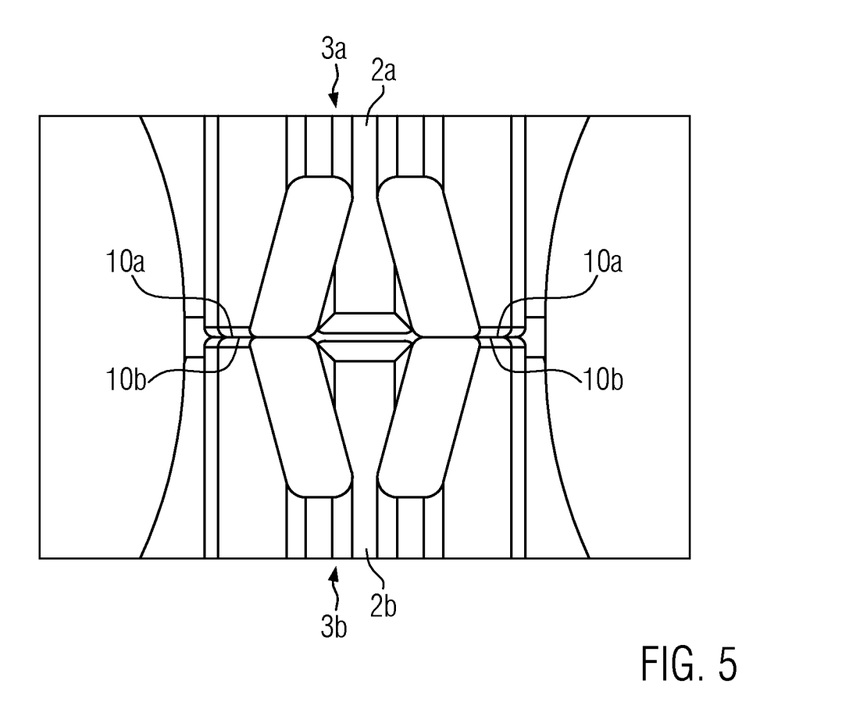
FIG. 5 shows the embodiment shown in FIG. 4, in a closed position.

As can especially be seen from FIGS. 3 to 5, the electrodes $2a$, $2b$ are arranged such that a sausage neck 4 can be placed therebetween. This means that the width b (cf. FIG. 4) of the stamp element pair $3a$, $3b$ is smaller than the length 1 of the sausage neck 4.

Figure 16:
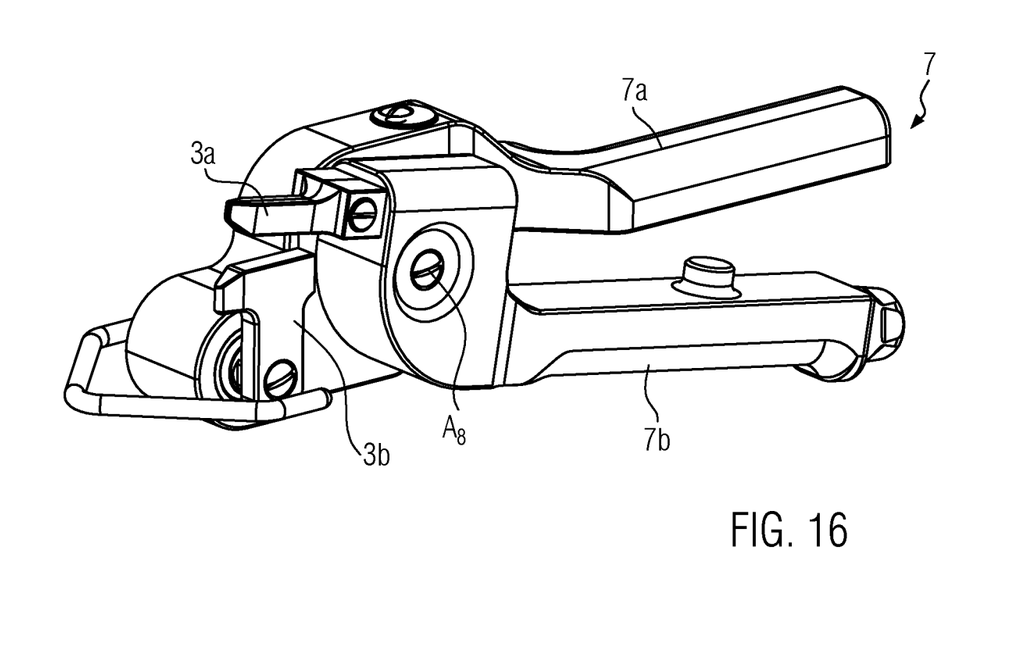
FIG. 16 shows, in a perspective view, a closure module according to a further embodiment of the present disclosure (similar to a pair of pliers).

The embodiment shown in FIGS. 1 to 5 is configured as a hand module. To this end, the closure module 1 comprises a handle area 7 having two handle elements $7a$, $7b$ that are movable relative to each another. The upper elongate handle element $7a$ is connected to a closure element $8a$ having arranged thereon the first stamp element pair $3a$ and the first electrode $2a$. The lower handle element $7b$ is connected to the closure element $8b$ having arranged thereon the second stamp element pair $3b$ and the second electrode $2b$. Via the column guides 9, the distance between the electrodes $2a$, $2b$ can be reduced, when handle element $7a$ is moved relative to handle element $7b$, as shown by the arrow P. However, the distance between the electrodes may also be reduced with a mechanical structure, similar to a pair of pliers, as shown in FIG. 16. The handle element $7a$ and the handle element $7b$ are here supported such that they are rotatable about the axis $A_8$ and coupled to the stamp elements and electrodes such that opposed stamp elements and electrodes will move towards one another, when the handle elements are moved towards each another. The handle elements $7a$, $7b$ may here be preloaded towards an open position by a spring, which is not shown.

Figure 15:
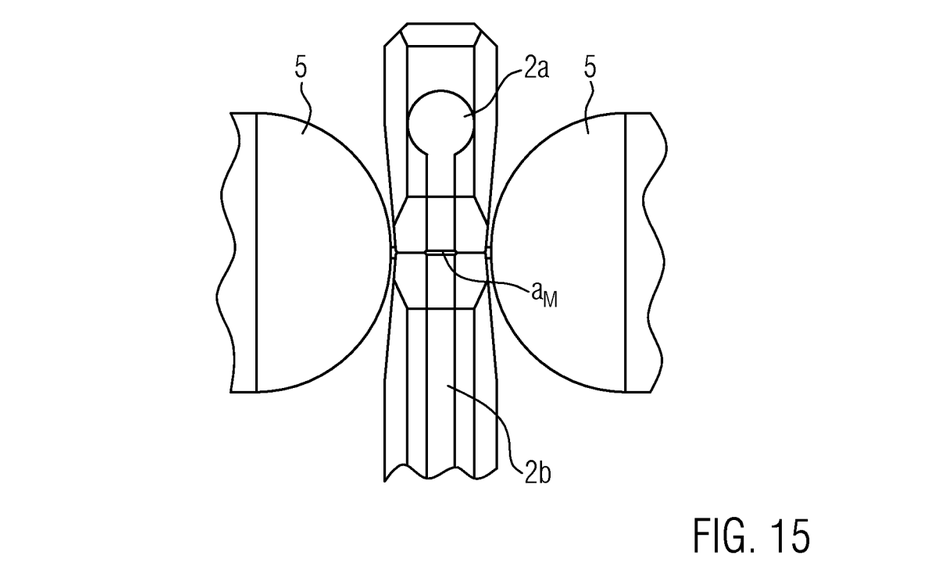
FIG. 15 shows, in a highly schematic view, a possible electrode arrangement according to the present disclosure.

FIG. 4 shows the closure module 1 in a slightly open state. Here, it can be seen that the stamp pairs $3a$, $3b$ have not yet been moved into contact with one other, but already enclose the sausage neck. In FIG. 5, the end faces of the stamp element pairs $3a$, $3b$ have been moved into contact with one another and can thus clamp the sausage neck 4. The electrodes $2a$, $2b$, however, cannot be moved fully into contact with one another, but are spaced apart by a minimum distance $a_M$ such that a short circuit will be prevented, when a voltage is applied to the electrodes. FIG. 15, for example, shows this minimum distance $a_M$. The minimum distance $a_M$ is in the range of e.g. 0.1 mm to 3 mm in the case of a sausage neck diameter of 0.2 mm to 5 mm. According to this embodiment, the electrodes $2a$, $2b$ are located on opposite sides of the sausage neck 4 and are not displaced relative to one another.

In the closed position shown in FIG. 5, a voltage can now be applied to the electrodes $2a$, $2b$ for the purpose of closing, or closing and separating. To this end, the electrodes are connected to a voltage supply e.g. via cables that are not shown.

The voltage supply may either be started automatically via a position switch, when the closure module 1 is at a closed position, or activated manually via a switch which is not shown. The latter may be a switch on the device or e.g. a foot switch.

According to at least one embodiment, the voltage supply takes place automatically. A measuring potential is applied between the two electrodes. Making use of the measuring potential, e.g. the resistance between the electrodes can be measured and, depending on the resistance, it can be determined whether a sausage casing is present between the electrodes. If it is determined that a sausage neck is present between the electrodes in the closure module, the voltage and/or the current and consequently the closing power will automatically be increased, in particular after an adjustable period of time.

The sausage neck serves as an electrolyte between the electrodes $2a$, $2b$. The current flows from an electrode $2a$ through the sausage neck 4 into the lower electrode $2b$. When the current flows through the sausage neck 4, the electric energy is converted into thermal energy and heats the sausage neck. In natural casings the thermal denaturation of collagen, i.e. the coagulation of protein from approx. T=65° C., will then begin. A sign indicating this is a whitish discoloration. From approx. T=100° C. onwards, the water evaporates and the e.g. open natural casing or sausage neck will coagulate and be closed. In response to a further supply of energy, the temperature rises and the sausage casing decomposes; as a result, the sausage neck 4 is cut off. The decisive aspect is the heat development and the power supplied. The higher the amount of energy supplied per unit time (i. e. electric power) is, the faster the rise in temperature of e.g. the natural casing will be. If an excessive amount of power is supplied, a denaturation of the casing will not take place, but fast heating and decomposition and cutting off of the sausage neck will occur. Coagulation and closing of the division point has then not taken place. Therefore, it will be of advantage when the power is not excessively high at the beginning, so that denaturation can take place slowly.

The fact that the sausage neck is clamped by the stamp element pairs allows closing and separating in a particularly careful manner. At the rounded sausage end 6, mechanical stresses acting on the sausage casing are caused by the e.g. twisted-off division point and by the displacement of the sausage mass, i.e. the sausage meat. If a current were now introduced directly at the rounded sausage end, the sausage casing, which is under mechanical stress, might tear during heating. Due to the fact that the sausage neck is clamped before the transition to the rounded sausage end 6, the mechanical stresses are "held back". The current is introduced between the stamp elements through the electrode pair $2a$, $2b$ and flows exclusively through the sausage neck, but not through the sausage casing of the rounded sausage end, which is under mechanical stress. The clamping of the sausage neck must not be eliminated until the flow of current has ceased to exist and in particular not until denaturation has taken place, so that reliable closing will be possible.

A separation process can be initiated by briefly increasing the electric power (peak) after the electric power for closing and denaturation.

The clamping can be eliminated by moving the handle elements $7a$, $7b$ apart. Since the closure module applies the voltage not to the filled sausages or sausage casings 5 themselves, but to a sausage neck, the closure module according to the present disclosure can also be used for closing a sausage end.

Figure 6:
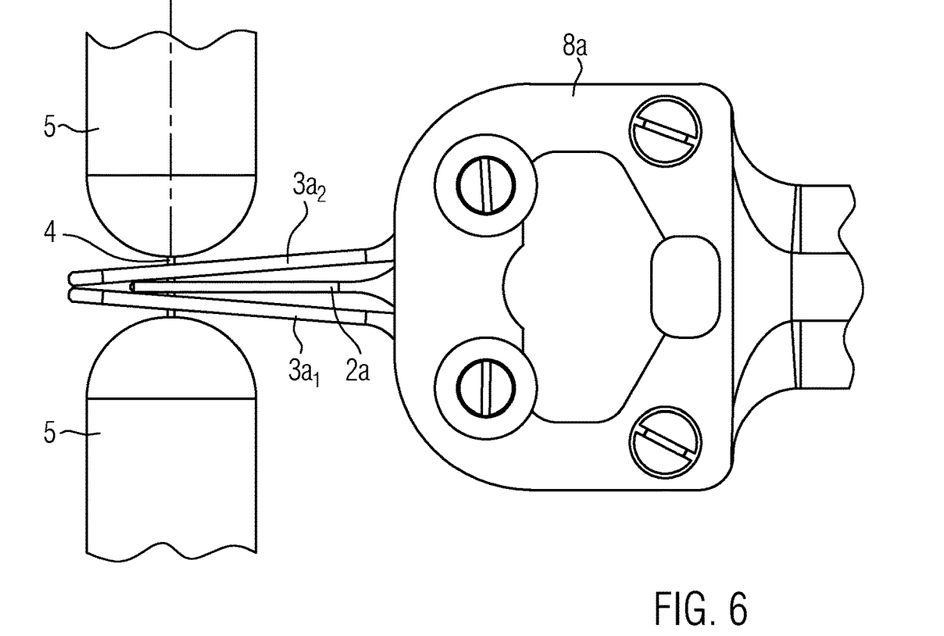
FIG. 6 shows a top view of a further embodiment according to the present disclosure in a non-spread-apart position.
Figure 7:
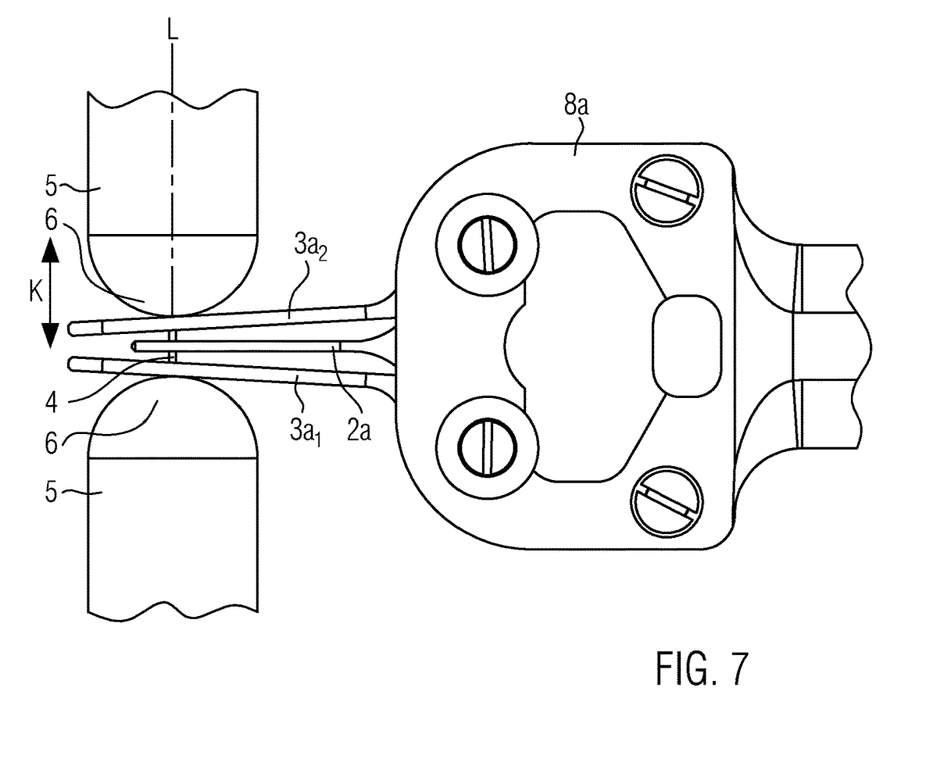
FIG. 7 shows the embodiment shown in FIG. 6, in a spread-apart position.

In connection with FIGS. 6 to 9, a further embodiment of the present disclosure will be explained in more detail. The embodiment shown in FIGS. 6 to 9 essentially corresponds to the first embodiment, the second embodiment having, however, a spreading function of the stamp elements. FIG. 6 shows a top view of the embodiment, where the closure module 1 is at an open position, i.e. the stamp elements $3a_1$, $3b_1$, $3a_2$, $3b_2$ are spaced apart in a direction V and the stamp pairs 3a, 3b can be introduced between the filled sausage casings 5 and can receive the sausage neck therebetween. As can be seen from FIG. 7, the stamp pair elements $3a_1$, $3a_2$, $3b_1$, $3b_2$ can be moved laterally away from the electrode 2a, 2b in the direction of the arrow K, i.e. they can be spread. FIG. 7 shows the stamp elements $3a_1$, $3a_2$ at a spread-apart position, the closure module 1 being closed, as can be seen e.g. in FIG. 5. This means that the stamp pair elements can move in a direction L (i.e. a direction comprising at least a directional component in the direction L). This spreading function allows the closure module to be applied also within a narrower division point, i.e. a shorter sausage neck 4, and to be spread subsequently. The spreading stretches the sausage neck, so that it can be cut through reliably. Without this spreading function, i.e. when the stamp elements are already above the rounded sausage ends 6 at a spread-apart position upon engaging the sausage neck, there is the risk that, during closing, the stamp elements will apply pressure to the rounded sausage ends, which are under mechanical stress, and will then cause damage to them. According to the present disclosure, only the sausage neck is clamped, the rounded sausage ends 6 remain unaffected.

Figure 8:
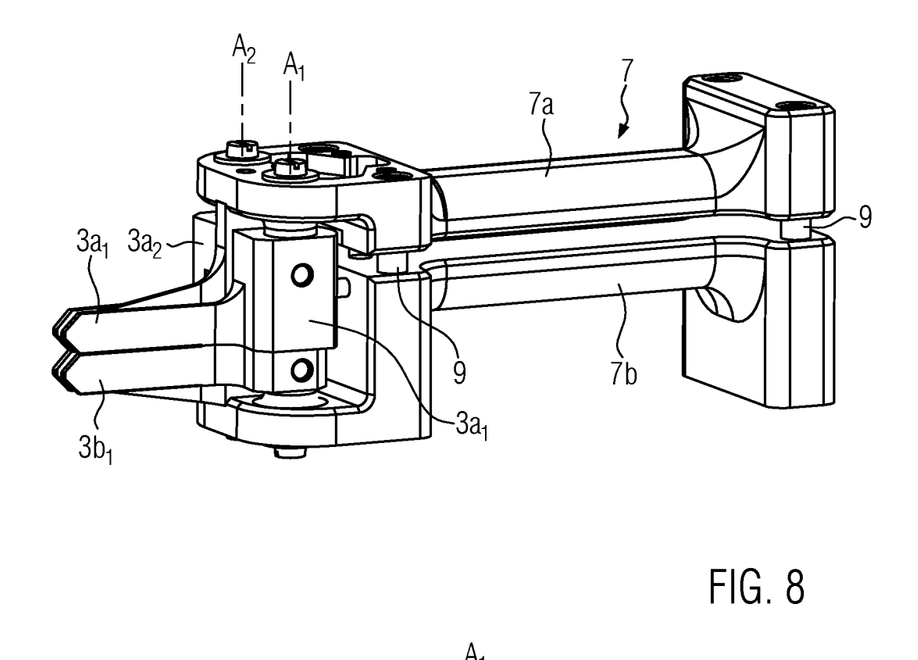
FIG. 8 shows a perspective representation of the embodiment shown in FIGS. 6 and 7, in a spread-apart position.
Figure 9:
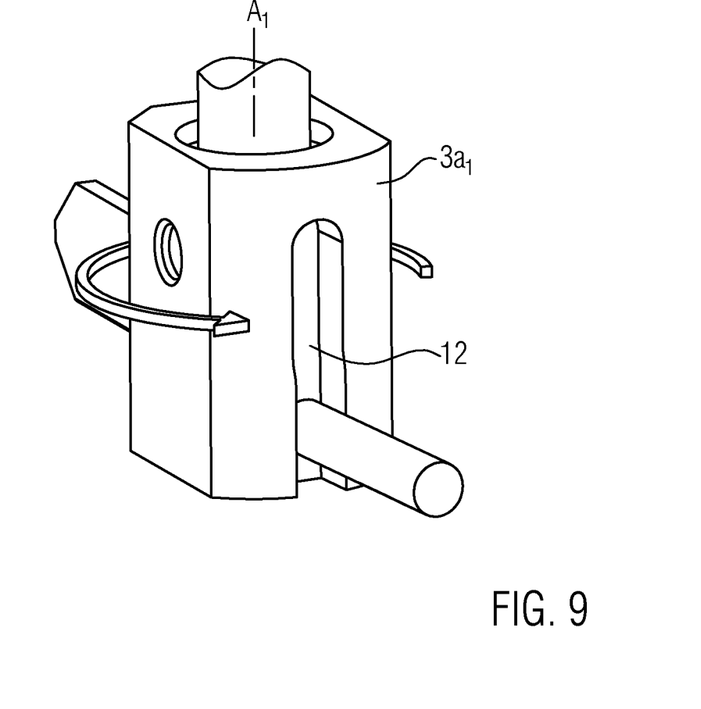
FIG. 9 shows a perspective representation of a stamp element with a curved guide.

For moving the spreading elements apart, a curved path (cam path) 12 may be provided, as can be seen from FIGS. 8 and 9, which accomplishes that the stamp elements are spread apart shortly before the sausage neck 4 is clamped. To this end, the guide unit comprises e.g. a curved path 12 according to one or more embodiments, the curved path being e.g. configured such that, when the opposed stamp elements are moved towards one another in a direction V, the stamp elements will, at least sectionwise, simultaneously move apart and pivot outwards about an axis $A_1$, $A_2$. This means that the stamp elements $3a_1$, $3a_2$ pivot outwards about the axes $A_1$, $A_2$, i.e. they move apart and will be spread.

The opposed stamp elements $3b_1$, $3b_2$ are simultaneously pivoted apart by the mechanism described hereinafter. The stamp element $3a_1$ is connected to the shaft by means of a pin arranged transversely to the axis $A_1$, the center of said shaft corresponding to the axis $A_1$. This shaft is rotatably supported in the upper handle element 7a. In addition, the lower handle element 7b has fixed therein a pin that engages the curved path 12 of the stamp element $3a_1$. When the two handle elements 7a and 7b are moved towards each other, also the stamp element $3a_1$ will be moved linearly relative to the lower handle element 7b, and the curved path 12 will, due to its Z-shaped contour, cause the stamp element $3a_1$ to move outwards in a pivotal movement. The shaft $A_1$ can be moved axially within the stamp element $3b1$. A pin arranged in the stamp element $3b_1$ transversely to the axis $A_1$ extends through the shaft $A_1$ in a vertically provided elongate hole, so that, although rotation can be transmitted from the shaft $A_1$ to the stamp element $3b_1$, the shaft $A_1$ is freely movable in a direction longitudinal to the stamp element $3b_1$. In this way, a synchronous pivotal movement with the two stamp elements $3a_1$ and $3b_1$ is produced in an inward and in an outward direction. The two stamp elements $3a_2$ and $3b_2$ move analogously thereto.

The guide shown in FIGS. 8 and 9 is only one example showing how the stamp elements can move apart. It is only essential that, in a closed position of the closure module, the distance between the stamp elements of the stamp element pairs in the area of the sausage neck is larger than in the open condition.

Figure 10:
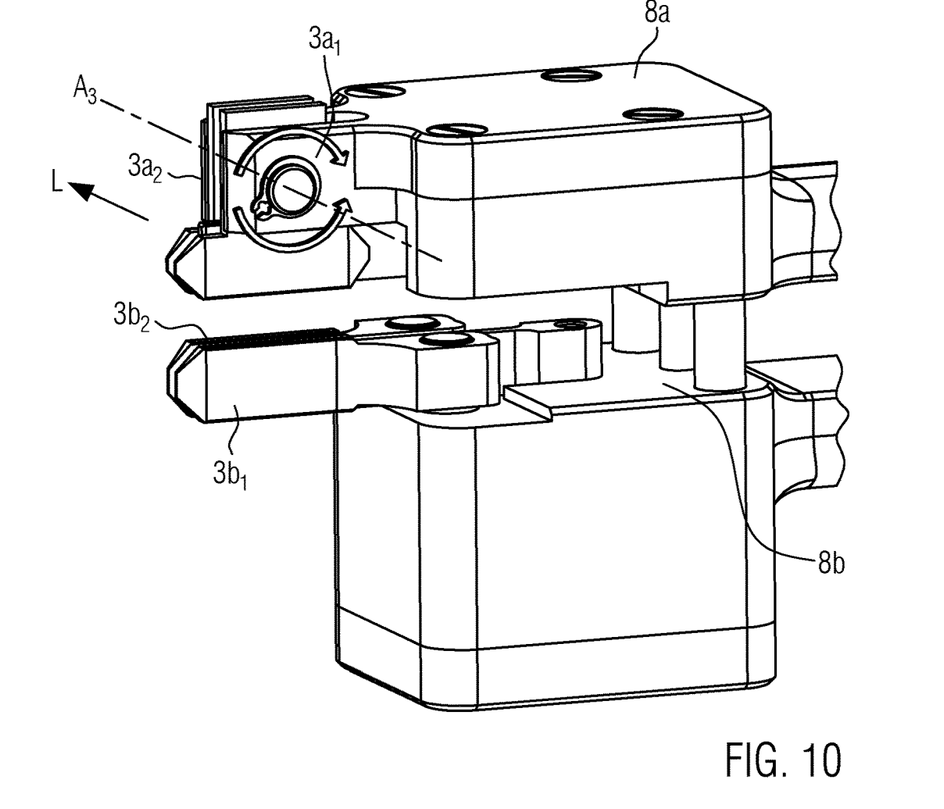
FIG. 10 shows a perspective representation of a further embodiment of a closure module comprising a rotatably supported stamp element pair.
Figure 11:
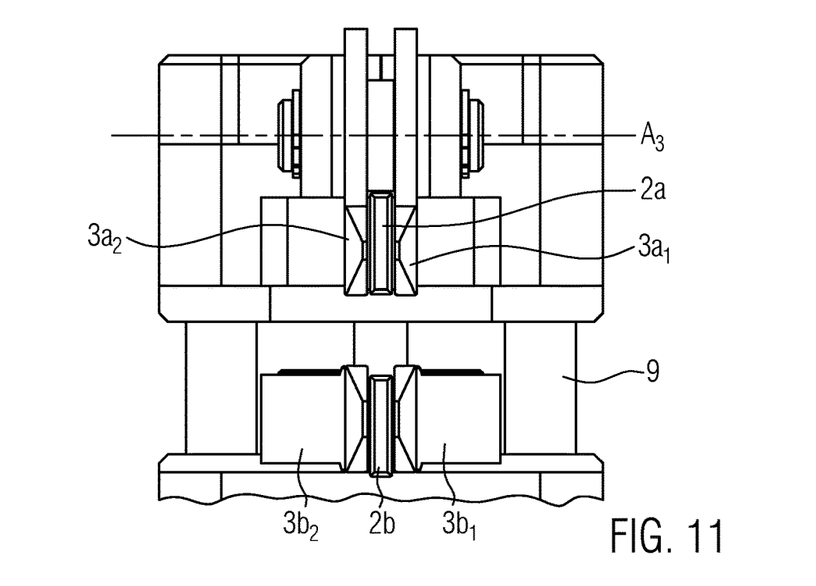
FIG. 11 shows a front view of the embodiment shown in FIG. 10.

FIG. 10 shows a further embodiment according to the present disclosure, the stamp elements $3a_1$, $3a_2$ being supported such that they are freely rotatable about an axis $A_3$ extending in a longitudinal direction L. This is advantageous insofar as it can be ensured that the end faces of the opposed stamp elements are always oriented parallel to each other and that tolerances can therefore be compensated.

Figure 12:
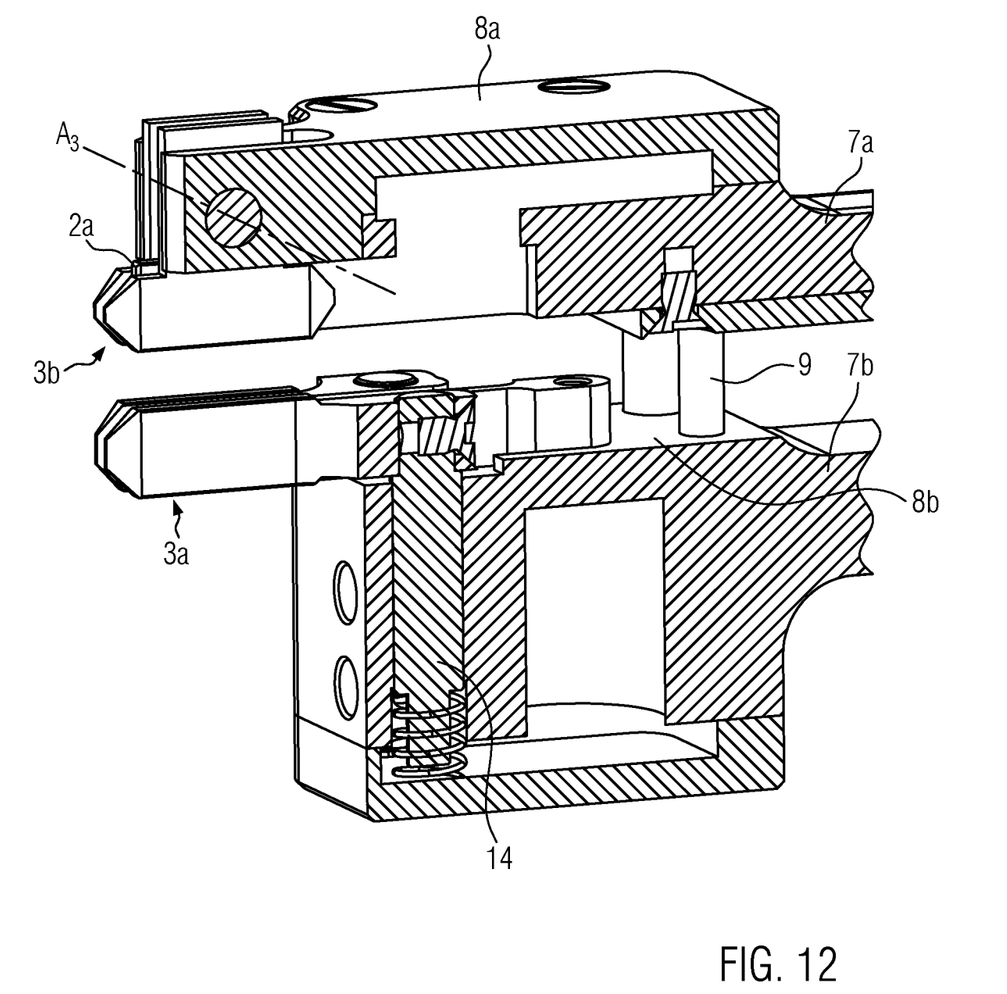
FIG. 12 shows a further embodiment of the closure module according to the present disclosure comprising a spring-loaded linear guide.

FIG. 12 shows a further embodiment of the present disclosure. FIG. 12 essentially corresponds to the embodiment shown in FIGS. 10 and 11, where e.g. the first stamp element pair 3a is rotatably supported. The lower stamp element pair comprises a spring-loaded linear guide 14. Also this guide allows tolerance compensation, so that the stamp elements can orient themselves parallel to one another.

Figure 13:
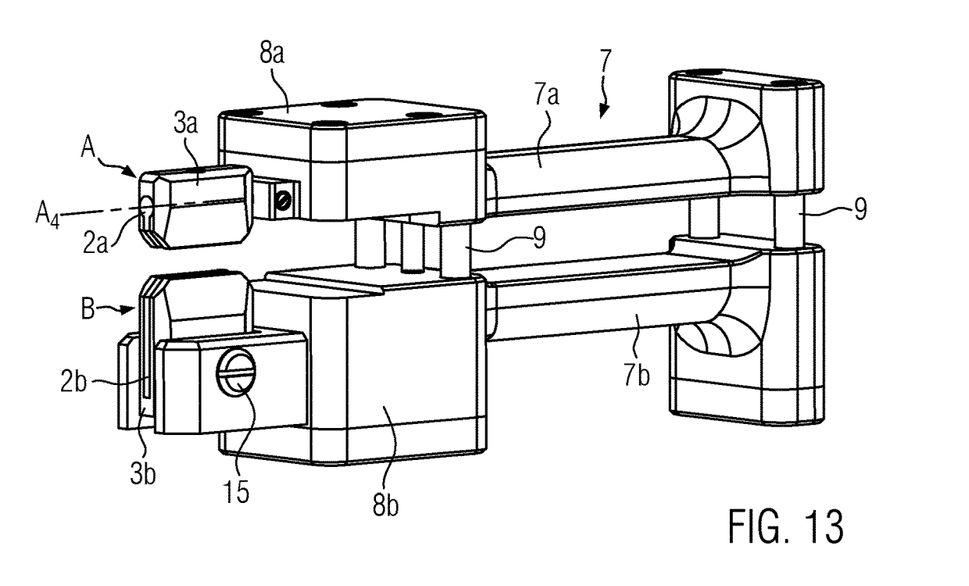
FIG. 13 shows a further embodiment of the present disclosure in a perspective representation.
Figure 14:
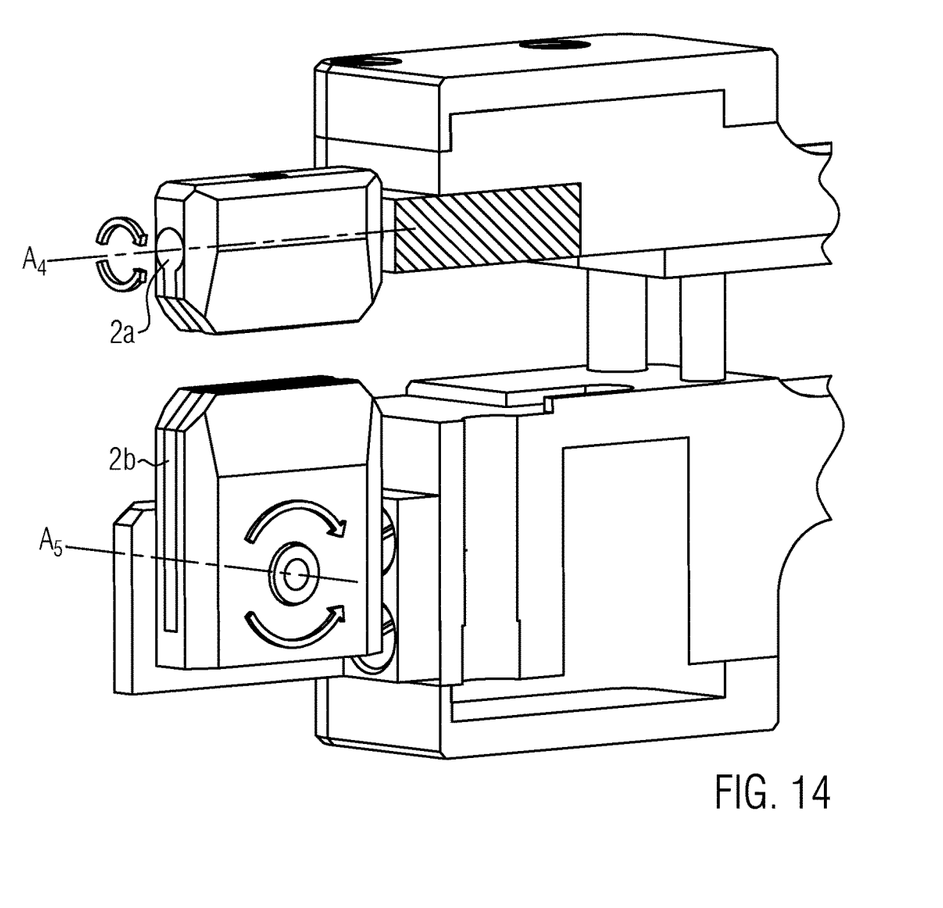
FIG. 14 shows a sectional view of the embodiment shown in FIG. 13.

According to at least one embodiment, the closure module 1 has two closure elements A, B, which are movable relative to and towards each other, as shown in FIGS. 13 and 14, and which comprise electrodes and stamp elements 2a, $3a_1$, $3a_2$ and 2b, $3b_1$, $3b_2$ combined as a unit. The stamp pair, which is here configured e.g. as an integral component, abuts, when seen in the longitudinal direction, on both sides of the electrode 2a, 2b, thus defining a clamping point on both sides of the electrode. The respective unit A, B may here be rotatably supported. The units may e.g. be an injection molded part, the electrodes being integrated as a kind of insert plate during the injection molding process in the mold. The electrodes are positioned in spaced-apart relationship ($a_M$), so that a contact and thus an electrical short-circuit will be excluded. The units A, B may e.g. be pluggably mounted, so that they can be replaced quickly in the event of contamination and so that there will be no, or only a short production downtime. Also in the case of this embodiment, it is important that the sausage neck or the open sausage end is clamped before the transition to the rounded sausage end 6.

As can be seen from FIGS. 13 and 14, the respective units A, B can then be rotatably supported. Unit A is e.g. supported such that it is freely rotatable about the axis $A_4$ so as to allow tolerance compensation. The lower closure unit B is supported such that it is rotatable about an axis $A_5$ extending here perpendicular to the axis $A_4$ and in the direction L.

The method according to the present disclosure will be explained hereinafter making reference to FIGS. 1 to 7.

For closing, or for closing and separating filled sausage casings 5 connected via a sausage neck 4, the closure module 1 is first placed e.g. between two filled sausage casings 5 or at an open sausage end (not shown). To this end, the opposed stamp element pairs 3a, 3b are introduced into an area between the filled sausage casings 5, such that the sausage neck 4 is placed between the electrodes 2a, 2b and the stamp elements $3a_1$, $3b_1$, $3b_2$, $3b_2$, as shown e.g. in FIG. 3.

For the purpose of closing, or closing and separating, the stamp elements and the electrodes 2a, 2b must now be moved relative to one other, as shown by the arrow P in FIG. 1. For this purpose, e.g. an operator may use the closure module 1 like gripping pliers, and take hold of the handle area 7 and move the handle elements 7a, 7b relative to each other. In particular, the handle element 7a is pressed down via the column guide 9 towards the handle element 7b. As a result, also the electrodes 2a, 2b as well as the stamp element pairs 3a, 3b will move relative to one another until the end position shown in FIG. 4 and finally in FIG. 5 has been reached. As shown in FIG. 5, the end faces 10a, 10b of the respective stamp elements are here moved into contact with each other such that the sausage neck 4 is clamped therebetween. At this end position or position of contact, the opposed electrodes 2a, 2b are in spaced-apart relationship with each other. The sausage neck 4 is located between the electrodes. It is also possible that at this position the respective stamp elements are, as has been described hereinbefore, at a spread-apart position of the type shown e.g. in FIG. 7. Via a position switch or manual operation of a suitable switch, current can then flow from a current source (not shown) through cables, which are not shown either, via the electrode 2a into the sausage neck 4 and from there into the lower electrode 2b. Currents which proved to be particularly suitable are high-frequency currents in a frequency range of 300 kHz to 500 kHz. The voltage lies advantageously in a range of 80 to 430 V. The electric energy is converted into thermal energy and heats the sausage neck to temperatures of 60 to 350° C. In this temperature range, e.g. the thermal denaturation of collagen begins, a sign indicating this denaturation being a whitish discoloration.

From approx. T=100° C. onwards, the water evaporates and the e.g. open natural casing coagulates and is closed. In response to a further supply of energy, the temperature rises and the sausage neck decomposes and is cut off.

According to at least one embodiment, a certain amount of energy per unit time is supplied during a first time interval $t_1$, such that the sausage neck is heated and will close, in particular coagulate. If it is also intended to cut off the sausage neck 4, a power increase, in particular a peaklike power increase, can take place during a second time interval $t_2$. This results in fast cutting off. The current supply is then terminated either manually or automatically, e.g. after a predetermined period of time or by triggering a switch or a position switch. The electrodes 2a, 2b and the stamp element pairs 3a, 3b can then be moved apart in a direction opposite to the direction of the arrow P, so that, as shown in FIG. 2, the distance a between the electrodes 2a, 2b is again established and the module 1 can be removed.

Instead of manually moving the electrodes 2a, 2b and the stamp element pairs 3a, 3b towards and away from one other, they may also be moved by a positioning drive, in particular a pneumatic or an electric positioning drive. Moving the components apart can easily be accomplished by the operator loosening his grip on the handle element 7a; e.g. the elements 7a, 7b may be spring-loaded by a spring, which is not shown, (e.g. in the column guides 9), so that the position spaced apart by the distance a will automatically be re-established.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. A closure module for closing and/or separating filled sausage casings connected via a sausage neck, comprising: a first electrode and a second electrode located opposite the first electrode, the first electrode and the second electrode being arranged such that a sausage neck is placed therebetween, and wherein the first electrode and the second electrode are adapted to be moved relative to each other and towards the sausage neck, so that a current can flow from the first electrode into the sausage neck and via the sausage neck into the second electrode.

2. The closure module according to claim 1, wherein the closure module further comprises a first stamp element as well as an oppositely disposed second stamp element, wherein the first stamp element and the second stamp element are adapted to be moved relative to and towards one another such that the sausage neck is clamped between the opposed stamp elements.

3. The closure module according to claim 2, wherein the closure module further comprises a first stamp pair with two juxtaposed, spaced-apart stamp elements as well as an oppositely disposed second stamp pair with two juxtaposed, spaced-apart stamp elements, wherein the first stamp pair and the second stamp pair are adapted to be moved relative to and towards one another such that the sausage neck is clamped between the first stamp pair and the second stamp pair, wherein respective electrodes are arranged between stamp elements of each of the first stamp pair and the second stamp pair.

4. The closure module according to claim 1, wherein the first electrode and the second electrode are movable towards one another only up to a minimum distance, when seen in a direction of movement.

5. The closure module according to claim 1, wherein juxtaposed stamp elements of a stamp element pair are configured as spreading elements that are laterally movable apart and away from the electrodes, and wherein the stamp elements are moveable apart before the stamp elements clamp the sausage neck.

6. The closure module according to claim 5, wherein the stamp element pair is provided with a guide unit, which is configured such that, when the opposed stamp elements are moved towards one another, the stamp elements are, at least sectionwise, laterally moveable away from one another.

7. The closure module according to claim 1, wherein stamp elements of at least one stamp element pair are supported such that they are freely rotatable about an axis extending substantially along a longitudinal direction and transversely to a direction of movement of the electrodes and/or are freely rotatable about an axis extending substantially transversely to a longitudinal direction of the closure module and transversely to the direction of movement of the electrodes.

8. The closure module according to claim 1, further comprising at least one stamp element pair, wherein the at least one stamp element pair comprises a spring-loaded linear guide.

9. The closure module according to claim 1, wherein the closure module comprises two closure units, which are movable towards each other, a first closure unit of the two closure units comprising the first electrode and a first stamp element pair and a second closure unit of the two closure units comprising the second electrode and a second stamp element pair.

10. The closure module according to claim 9, wherein at least one closure unit of the two closure units is supported such that it is rotatable about an axis in a longitudinal direction and/or an axis transversely to the longitudinal direction and transversely to a direction of movement.

11. The closure module according to claim 1, wherein the first electrode and the second electrode and respective stamp elements are movable relative to and towards one another manually or by means of a positioning drive.

12. The closure module according to claim 11, wherein the positioning drive is a pneumatic or an electric positioning drive.

13. The closure module according to claim 1, wherein the closure module is configured as a hand-held device with a handle area that comprises two spaced-apart, opposed handle elements, which are movable relative to and towards each other and which are each coupled with respective opposed electrodes, or electrodes and stamp elements such that, when the handle elements are moved towards each other, also the respective opposed electrodes and stamp elements will move towards each other.

14. A method for closing and/or separating filled sausage casings connected via a sausage neck, comprising the following steps:
placing a sausage neck between a first electrode and a second electrode located opposite the first electrode, the first electrode and the second electrode being spaced-apart from rounded sausage ends of the filled sausage casings such that the first electrode and the second electrode do not contact the filled sausage casings,
moving the first electrode and the second electrode relative to each other onto the sausage neck such that a current will flow from the first electrode into the sausage neck and via the sausage neck into the second electrode, whereby the filled sausage casings are closed preferably separated from one another.

15. The method according to claim 14, wherein during closing, the sausage neck is clamped by at least two opposed stamp elements while the electrodes are moved relative to and towards each other only up to a minimum distance.

16. The method according to claim 15, wherein the sausage neck is clamped by opposed stamp element pairs each comprising two stamp elements having a respective electrode arranged therebetween.

17. The method according to claim 14, wherein during a first period of time $t_1$, an amount of energy per unit time is supplied through the first electrode and the second electrode such that the sausage neck is heated and closed, and wherein preferably during a second period of time $t_2$, the amount of energy per unit time is increased, in particular in a peaklike manner, such that the sausage neck will decompose and will be cut off.

18. The method according to claim 14, wherein a sausage casing of the filled sausage casing is an electrically conductive sausage casing.

19. The method according to claim 14, wherein the current is a high-frequency current, in particular in a frequency range of 300 kHz to 500 kHz.

20. The method according to claim 14, wherein a voltage in a range of 50-500 V is applied to the first electrode and the second electrode.

* * * * *